United States Patent
Suzuki

(10) Patent No.: US 11,707,997 B2
(45) Date of Patent: Jul. 25, 2023

(54) IN-VEHICLE DC-DC CONVERTER

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hikaru Suzuki, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 90 days.

(21) Appl. No.: 17/042,811

(22) PCT Filed: Mar. 11, 2019

(86) PCT No.: PCT/JP2019/009583
§ 371 (c)(1),
(2) Date: Sep. 28, 2020

(87) PCT Pub. No.: WO2019/188166
PCT Pub. Date: Oct. 3, 2019

(65) Prior Publication Data
US 2021/0016671 A1    Jan. 21, 2021

(30) Foreign Application Priority Data
Mar. 29, 2018   (JP) .............................. JP2018-063785

(51) Int. Cl.
*B60L 50/60*    (2019.01)
*B60L 53/22*    (2019.01)
(Continued)

(52) U.S. Cl.
CPC ............... *B60L 53/22* (2019.02); *B60L 50/60* (2019.02); *B60L 58/10* (2019.02); *H02M 3/1582* (2013.01); *B60L 2210/10* (2013.01)

(58) Field of Classification Search
CPC .......... B60L 53/22; B60L 50/60; B60L 58/10; B60L 2210/10; B60L 50/40; B60L 50/50;
(Continued)

(56) References Cited

U.S. PATENT DOCUMENTS 7,133,602 B2    11/2006  Yamada
2013/0043844 A1*   2/2013  Tashiro ............... H02J 7/00309
                                                                     320/128
(Continued)

OTHER PUBLICATIONS

International Search Report, Application No. PCT/JP2019/009583, dated May 7, 2019. ISA/Japan Patent Office.

*Primary Examiner* — Elim Ortiz
(74) *Attorney, Agent, or Firm* — Honigman LLP

(57) ABSTRACT

Provided is a configuration in which, in an in-vehicle DC-DC converter, a limitation value of input power or output power can be determined according to the temperature of a power storage unit. In an in-vehicle DC-DC converter (1), a determination unit uses a scheme for determining whether or not input power of an input-side conductive path has reached an input power limitation value that is determined according to an input voltage of the input-side conductive path and a temperature range to which the temperature of an input-side power storage unit belongs, or a scheme for determining whether or not output power of an output-side conductive path has reached an output power limitation value that is determined according to an output voltage of the output-side conductive path and a temperature range to which the temperature of an output-side power storage unit belongs.

8 Claims, 7 Drawing Sheets

(51) Int. Cl.
*B60L 58/10* (2019.01)
*H02M 3/158* (2006.01)

(58) Field of Classification Search
CPC .......... B60L 53/00; B60L 55/00; B60L 58/00; B60L 3/0053; H02M 3/1582; H02M 3/155; B60R 16/02; H02J 7/00
USPC ............... 320/128, 134, 150, 153, 137, 144; 180/65.31; 323/271, 364, 907
See application file for complete search history.

(56) References Cited

U.S. PATENT DOCUMENTS

2014/0100803 A1\* 4/2014 Sekiguchi .......... G01R 31/3648
    702/63
2017/0366023 A1\* 12/2017 Tanaka ...................... H02J 7/04

\* cited by examiner

FIG. 2
(A)
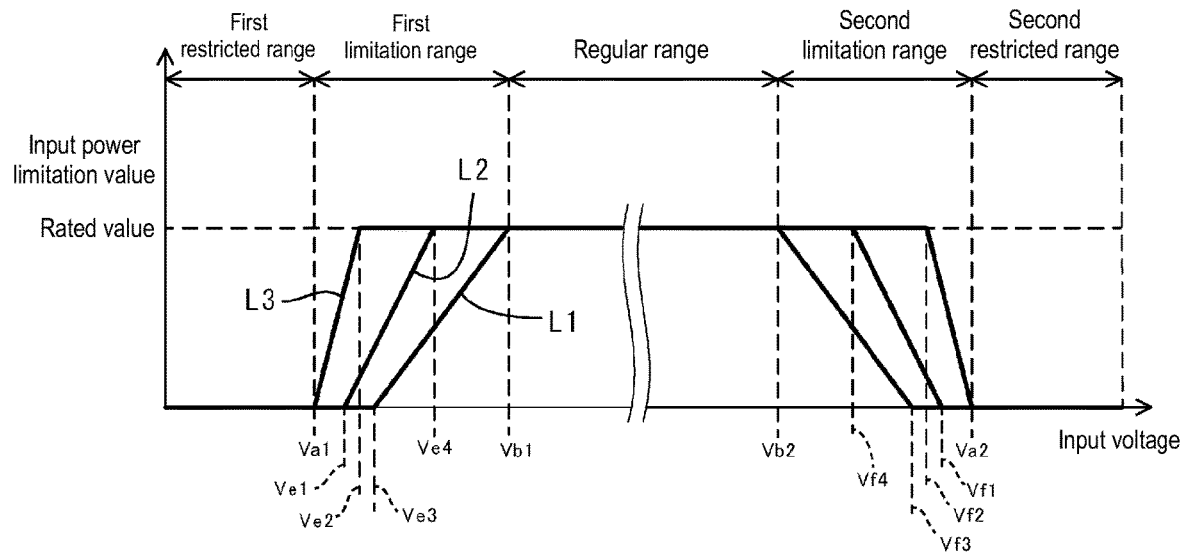
(B)
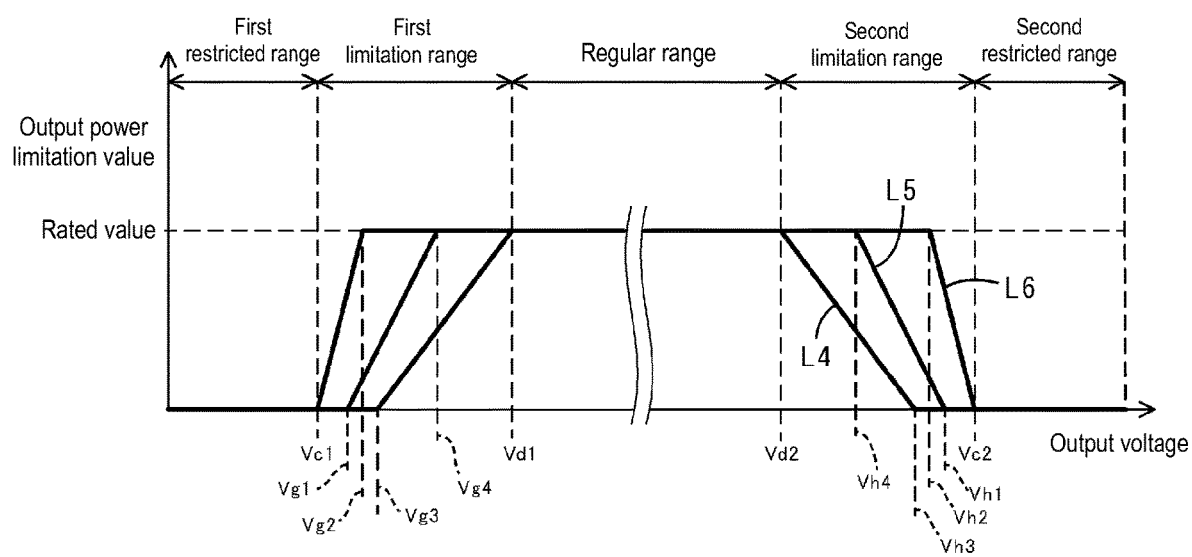

IN-VEHICLE DC-DC CONVERTER

CROSS-REFERENCE TO RELATED APPLICATIONS

This application is the U.S. national stage of PCT/JP2019/009583 filed on Mar. 11, 2019, which claims priority of Japanese Patent Application No. JP 2018-063785 filed on Mar. 29, 2018, the contents of which are incorporated herein.

TECHNICAL FIELD

The present disclosure relates to an in-vehicle DC-DC converter.

BACKGROUND

JP-2005-210779A discloses an example of a power supply apparatus that drives and controls a motor generator. This power supply apparatus includes a battery that generates an input voltage, a converter that converts the input voltage into a motor operation voltage in accordance with a voltage command value, a smoothing capacitor that holds the motor operation voltage, an inverter that drives and controls the motor generator in accordance with a torque command value when supplied with the motor operation voltage, and a control apparatus that generates a voltage command value and a torque command value. This power supply apparatus can determine a value for limiting the power that is input to the converter and a value for limiting the power that is output from the converter.

Incidentally, according to a configuration in which a conductive path electrically connected to a power storage unit is used as an input-side conductive path, and voltage conversion is performed such that a voltage on the input-side conductive path is stepped up or down, and is output to an output-side conductive path, it is required to thoroughly prohibit a current from being taken in from the power storage unit through a voltage conversion operation by a voltage conversion unit when a charging voltage of the power storage unit has dropped to a level at which current supply needs be immediately prohibited (restricted range). However, when the charging voltage of the power storage unit is in a voltage range that is slightly higher than such a restricted range, it is desirable to be able to make best use of the power storage unit while preventing the charging voltage from reaching the restricted range. As a method for this purpose, it is conceivable that a threshold value that is slightly higher than the restricted range is set, and, when an input voltage of the voltage conversion unit decreases to the threshold value or lower, a protection operation such as stopping the voltage conversion operation is performed. However, if such a method is adopted, if the threshold value is set too low, and if a large current is output when the temperature of the power storage unit is low (when the internal resistance of the power storage unit is high), the charging voltage of the power storage unit easily reaches the limit voltage. Conversely, if the threshold value is set too high, the range of an available charging voltage is made too small, and, particularly when the temperature of the power storage unit is high (when the internal resistance of the power storage unit is low), there is too large leeway.

Note that there is a problem similar to that, also with a charging voltage of a power storage unit electrically connected to the output-side conductive path, and, when the charging voltage of the output-side power storage unit has risen to a level at which current supply needs to be immediately prohibited (restricted range), it is required to thoroughly prohibit a current from flowing to the power storage unit through a voltage conversion operation by the voltage conversion unit. However, when the charging voltage of the output-side power storage unit is in a voltage range that is slightly lower than such a restricted range, it is desirable to be able to charge the power storage unit to the full while preventing the charging voltage of the power storage unit from reaching the restricted range. As a method for this purpose, it is conceivable that a threshold value that is slightly lower than the restricted range is set, and when an output voltage of the voltage conversion unit rises to the threshold value or higher, a protection operation such as stopping the voltage conversion operation is performed. However, if such a method is adopted, if the threshold value is set too high, and if a large current is output when the temperature of the power storage unit is low (when the internal resistance of the power storage unit is high), the charging voltage of the power storage unit easily reaches a limit voltage. Conversely, if the threshold value is set too low, the range of an available charging voltage is made too small, and, particularly when the temperature of the power storage unit is high (when the internal resistance of the power storage unit is low), there is too large leeway.

The present disclosure has been made in order to solve at least one of the above-mentioned issues, and aims to provide a configuration in which, in an in-vehicle DC-DC converter, a limitation value of input power or output power can be determined according to the temperature of a power storage unit.

SUMMARY

An in-vehicle DC-DC converter that is a first example of the present disclosure is an in-vehicle DC-DC converter that steps up or down a voltage applied to an input-side conductive path, which is one of a first conductive path and a second conductive path, and outputs the voltage to an output-side conductive path, which is the other of the first conductive path and the second conductive path. The in-vehicle DC-DC converter includes a voltage conversion unit that includes a switching element that performs an on/off operation in accordance with being supplied with a control signal. The voltage conversion unit steps up or down a voltage applied to the input-side conductive path, through an on/off operation by the switching element, and outputs the voltage to the output-side conductive path. A control unit outputs the control signal to the voltage conversion unit. An input voltage detection unit detects an input voltage applied to the input-side conductive path. An input current detection unit detects an input current flowing through the input-side conductive path. A determination unit determines whether or not input power of the input-side conductive path has reached an input power limitation value. A temperature information obtaining unit obtains temperature information for specifying a temperature of an input-side power storage unit electrically connected to the input-side conductive path. The determination unit determines, based on a limitation value setting scheme in which a plurality of temperature-specific limitation ranges that are voltage ranges lower than a predetermined regular voltage range are associated with a plurality of temperature ranges, limitation value information in which a relationship between the input voltage and the input power limitation value is determined such that the input power limitation value is decreased as the input voltage decreases is associated with the plurality of temperature ranges, and an upper limit voltage value is set higher for a temperature-specific limitation range associated with a lower temperature range and a degree of decrease in the input power limitation value for a decrease in the input voltage is made smaller for limitation value information associated with a lower temperature range, whether or not the input power of the input-side conductive path has reached the input power limitation value that is determined according to the input voltage of the input-side conductive path and a temperature range to which the temperature of the input-side power storage unit belongs.

An in-vehicle DC-DC converter that is a second example of the present disclosure is an in-vehicle DC-DC converter that steps up or down a voltage applied to an input-side conductive path, which is one of a first conductive path and a second conductive path, and outputs the voltage to an output-side conductive path, which is the other of the first conductive path and the second conductive path. The in-vehicle DC-DC converter includes: a voltage conversion unit that includes a switching element that performs an on/off operation in accordance with being supplied with a control signal. The voltage conversion unit steps up or down a voltage applied to the input-side conductive path, through an on/off operation by the switching element, and outputs the voltage to the output-side conductive path. A control unit outputs the control signal to the voltage conversion unit. An output voltage detection unit that detects an output voltage applied to the output-side conductive path; an output current detection unit detects an output current flowing through the output-side conductive path. A determination unit determines whether or not output power of the output-side conductive path has reached an output power limitation value. A temperature information obtaining unit obtains temperature information for specifying a temperature of an output-side power storage unit electrically connected to the output-side conductive path, and the determination unit determines, based on a limitation value setting scheme in which a plurality of temperature-specific limitation ranges that are voltage ranges higher than a predetermined regular voltage range are associated with a plurality of temperature ranges, limitation value information in which a relationship between the output voltage and the output power limitation value is determined such that the output power limitation value is decreased as the output voltage increases is associated with the plurality of temperature ranges, and a lower limit voltage value is set lower for a temperature-specific limitation range associated with a lower temperature range, and a degree of decrease in the output power limitation value for an increase in the output voltage is made smaller for limitation value information associated with a lower temperature range, whether or not the output power of the output-side conductive path has reached the output power limitation value that is determined according to the output voltage of the output-side conductive path and a temperature range to which the temperature of the output-side power storage unit belongs.

Advantageous Effects of Disclosure

The in-vehicle DC-DC converter that is the first example of the present disclosure can change the limitation value information (information in which the relationship between an input voltage and an input power limitation value is determined) according to the temperature of the input-side power storage unit, and can determine a limitation value of input power based on the temperature of the input-side power storage unit.

In addition, in the limitation value information corresponding to any temperature range, the relationship between an input voltage and an input power limitation value is determined such that the input power limitation value is decreased as the input voltage decreases, and thus the lower the input voltage is (in other words, the lower the charging voltage of the input-side power storage unit is), the more the input power is limited. Furthermore, the limitation value information is determined such that an upper limit voltage value of a temperature-specific limitation range is set higher for a lower temperature range and the degree of decrease in the input power limitation value for a decrease in the input voltage is made small, and thus, when the temperature of the power storage unit is lower, limitation can be started at a higher input voltage, and the range of an input voltage that is limited can be made wider.

The in-vehicle DC-DC converter that is the second example of the present disclosure can change the limitation value information (information in which the relationship between an output voltage and an output power limitation value is determined) according to the temperature of the output-side power storage unit, and can determine a limitation value of output power based on the temperature of the output-side power storage unit.

In addition, in the limitation value information corresponding to any temperature range, the relationship between an output voltage and an output power limitation value is determined such that the output power limitation value is decreased as the output voltage increases, and thus the higher the output voltage is (in other words, the higher the charging voltage of the output-side power storage unit is), the more the output power is limited. Furthermore, the limitation value information is determined such that a lower limit voltage value of a temperature-specific limitation range is set lower for a lower temperature range and the degree of decrease in the output power limitation value for an increase in the output voltage is made small, and thus, when the temperature of the power storage unit is lower, limitation can be started at a lower output voltage, and the range of an output voltage that is limited can be made wider.

BRIEF DESCRIPTION OF DRAWINGS

FIG. 2(A) is a graph that is related to a limitation value setting scheme for determining an input power limitation value, and illustrates the relationship between an input voltage and an input power limitation value, and FIG. 2(B) is a graph that is related to a limitation value setting scheme for determining an output power limitation value, and illustrates the relationship between an output voltage and an output power limitation value.

DETAILED DESCRIPTION OF PREFERRED EMBODIMENTS

Figure 1:
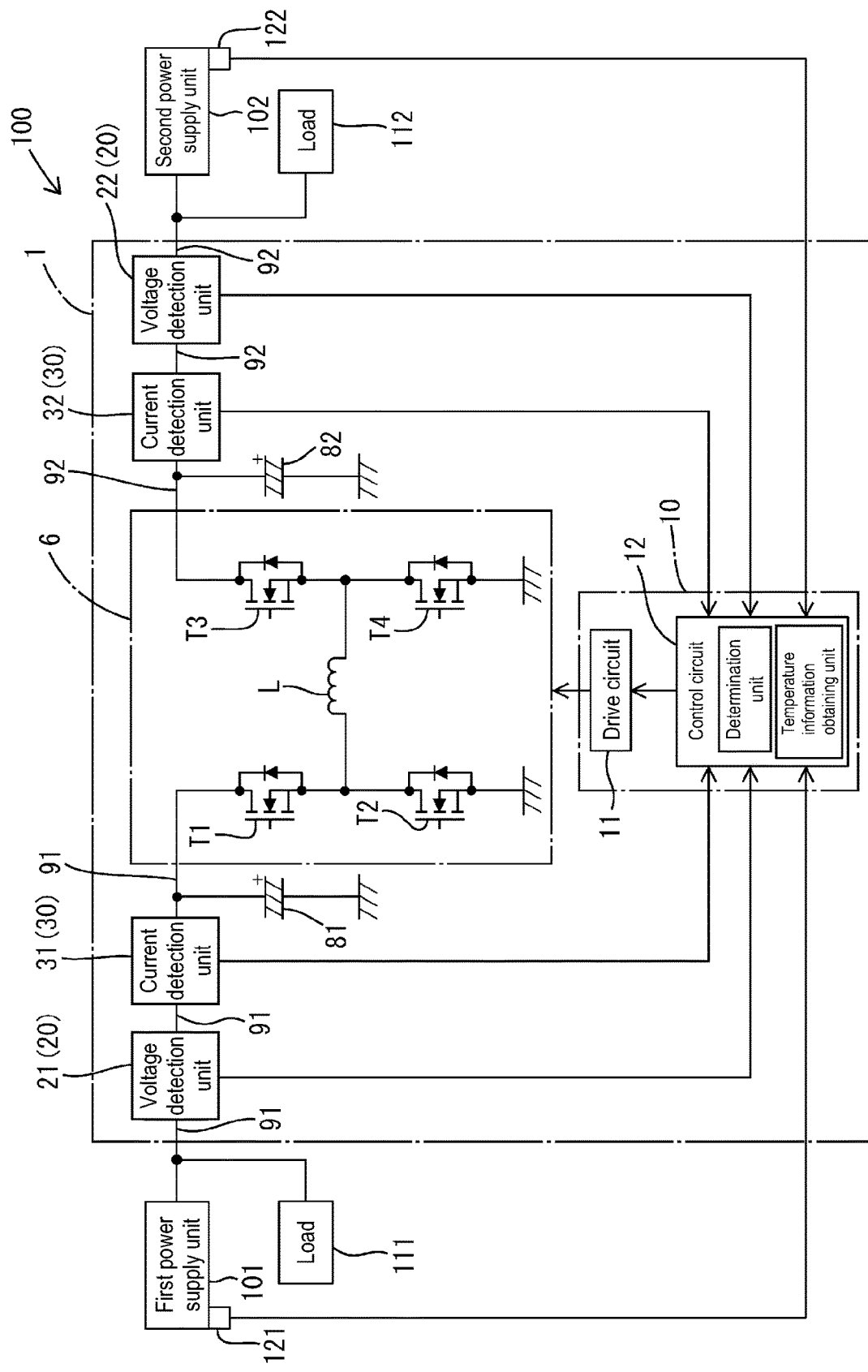
FIG. 1 is a circuit diagram schematically illustrating an in-vehicle power supply system that includes an in-vehicle DC-DC converter according to a first embodiment.

A preferred embodiment of the present disclosure will be described below.

In the above first example, in the limitation value setting scheme for determining an input power limitation value, the determination unit may determine a lower limit voltage value to be higher for a temperature-specific limitation range associated with a lower temperature range.

With such a configuration, the lower limit of an input voltage range (temperature-specific limitation range) for which an input power limitation value is determined according to an input voltage can be set higher for a lower temperature range, and thus, if a current change occurs when the input voltage is in the vicinity of the lower limit voltage value, an input power limitation value is easily reached at a higher input voltage when the temperature range is lower.

In the above first example, if the determination unit determines that the input power has reached the input power limitation value, the control unit may operate so as to stop or suppress a voltage conversion operation of the voltage conversion unit.

With such a configuration, when the input power decreases to a certain degree, it is possible to stop or suppress the voltage conversion unit taking in a current from the input-side power storage unit by stopping or suppressing the operation of the voltage conversion unit, and to change the limitation value of the input power when such a stopping or suppressing process is performed, according to the temperature of the input-side power storage unit.

In the above second example, in the limitation value setting scheme for determining an output power limitation value, the determination unit may determine an upper limit voltage value to be lower for a temperature-specific limitation range associated with a lower temperature range.

With such a configuration, the upper limit of an output voltage range (temperature-specific limitation range) for which an output power limitation value is determined according to an output voltage can be set lower for a lower temperature range, and thus, if a current change occurs when the output voltage is in the vicinity of the upper limit voltage value, an output power limitation value is easily reached at a lower output voltage when the temperature range is lower.

In the above second example, if the determination unit determines that the output power has reached the output power limitation value, the control unit may stop or suppress a voltage conversion operation of the voltage conversion unit.

With such a configuration, when the output power increases to a certain degree, it is possible to stop or suppress the voltage conversion unit causing a current to flow to the output-side power storage unit by stopping or suppressing the operation of the voltage conversion unit, and to change the limitation value of the output power when such a stopping or suppressing process is performed, according to the temperature of the output-side power storage unit.

First Embodiment

A first embodiment of the present disclosure will be described below.

Basic Configuration of In-Vehicle Power Supply System

An in-vehicle power supply system 100 as shown in FIG. 1 includes an in-vehicle DC-DC converter 1 (hereinafter, also referred to as a "DC-DC converter 1"), a first power supply unit 101, and a second power supply unit 102, and is configured as a system that can supply power to in-vehicle loads such as loads 111 and 112.

The DC-DC converter 1 is configured as an in-vehicle step-up/down DC-DC converter, for example, and is configured to step up or down a DC voltage applied to an input-side conductive path, which is one of a first conductive path 91 and a second conductive path 92, and outputs the voltage to an output-side conductive path, which is the other.

The DC-DC converter 1 includes the first conductive path 91 and the second conductive path 92, which are power lines. The first conductive path 91 is electrically connected to a high-potential terminal of the first power supply unit 101 provided as a high-voltage power supply unit, and is electrically continuous with this high-potential terminal. A configuration is adopted in which the first power supply unit 101 applies a predetermined DC voltage to the first conductive path 91. The second conductive path 92 is electrically connected to a high-potential terminal of the second power supply unit 102 provided as a low-voltage power supply unit, and is electrically continuous with this high-potential terminal. A configuration is adopted in which the second power supply unit 102 applies a predetermined DC voltage to the second conductive path 92.

Each of the first power supply unit 101 and the second power supply unit 102 is constituted by a known power storage means, such as a lead storage battery, a lithium-ion battery, an electric double-layer capacitor, a lithium-ion capacitor, or another power storage unit. An output voltage of the first power supply unit 101 should be higher than an output voltage of the second power supply unit 102, and these output voltages are not particularly limited to specific values. Low-potential terminals of the first power supply unit 101 and the second power supply unit 102 are electrically connected to a grounding unit (not illustrated), and kept at a predetermined ground potential (0V).

The in-vehicle load 111 is electrically connected to the first conductive path 91 electrically connected to the first power supply unit 101, and is configured to be supplied with power from the first power supply unit 101. The in-vehicle load 112 is electrically connected to the second conductive path 92 electrically connected to the second power supply unit 102, and is configured to be supplied with power from the second power supply unit 102. The in-vehicle loads 111 and 112 are known in-vehicle electrical components, and the types of the in-vehicle loads 111 and 112 are not particularly limited.

Note that a generator or the like may also be connected to the first conductive path 91 electrically connected to the first power supply unit 101 or the second conductive path 92 electrically connected to the second power supply unit 102.

A voltage conversion unit 6 has a function of stepping up or down a voltage input through on/off operations of switching elements T1, T2, T3, and T4, and outputting the voltage. The voltage conversion unit 6 is disposed between the first conductive path 91 and the second conductive path 92, and has a step-down function of performing a voltage step-down operation and a step-up function of performing a voltage step-up operation. The following describes an example where the voltage conversion unit 6 executes the step-down function of stepping down a voltage applied to the first conductive path 91 and outputting the voltage to the second conductive path 92, and the step-up function of stepping up a voltage applied to the second conductive path 92 and outputting the voltage to the first conductive path 91.

The voltage conversion unit 6 includes the switching elements T1, T2, T3, and T4, which are arranged in an H-bridge configuration, and an inductor L, and functions as a so-called bidirectional DC-DC converter. Each of the switching elements T1, T2, T3, and T4 is configured as an N-channel MOSFET. The inductor L is configured as a known coil. Note that the first conductive path 91 is electrically connected to one of the electrodes of a capacitor 81, and the other electrode of the capacitor 81 is electrically connected to the ground. The second conductive path 92 is electrically connected to one of the electrodes of a capacitor 82, and the other electrode of the capacitor 82 is electrically connected to the ground.

In the voltage conversion unit 6, the drain of the switching element T1 is electrically connected to the first conductive path 91, and the source of the switching element T1 is electrically connected to the drain of the switching element T2 and one end of the inductor L. The drain of the switching element T3 is electrically connected to the second conductive path 92, and the source of the switching element T3 is electrically connected to the drain of the switching element T4 and to the other end of the inductor L. The sources of the switching elements T2 and T4 are electrically connected to the ground. Signals from a drive circuit 11 to be described later are input to respective gates of the switching elements T1, T2, T3, and T4.

A voltage detection unit 20 includes voltage detection units 21 and 22. Each of the voltage detection units 21 and 22 is configured as a known voltage detection circuit. The voltage detection unit 21 inputs, to a control circuit 12, a value indicating the voltage of the first conductive path 91 (e.g., the voltage value of the first conductive path 91 or a value obtained by dividing the voltage value of the first conductive path 91 using a voltage-dividing circuit) as a detected value. The voltage detection unit 22 inputs, to the control circuit 12, a value indicating the voltage of the second conductive path 92 (e.g., the voltage value of the second conductive path 92 or a value obtained by dividing the voltage value of the second conductive path 92 using a voltage division circuit) as a detected value. The control circuit 12 can specify the voltage value of the first conductive path 91 based on the value input from the voltage detection unit 21 (value detected by the voltage detection unit 21) and can specify the voltage value of the second conductive path 92 based on the value input from the voltage detection unit 22 (value detected by the voltage detection unit 21).

A current detection unit 30 includes current detection units 31 and 32. Each of the current detection units 31 and 32 is configured as a known current detection circuit. The current detection unit 31 is a current detection circuit that detects a current flowing through the first conductive path 91, and is constituted by, for example, a shunt resistor disposed in the first conductive path 91 and a differential amplifier that amplifies and outputs voltages at the two ends of the shunt resistor. The current detection unit 32 is a current detection circuit that detects a current flowing through the second conductive path 92, and is constituted by, for example, a shunt resistor disposed in the second conductive path 92 and a differential amplifier that amplifies and outputs voltages at the two ends of the shunt resistor. The control circuit 12 specifies the value of a current flowing through the first conductive path 91 based on a value input from the current detection unit 31 (value detected by the current detection unit 31), and specifies the value of a current flowing through the second conductive path 92 based on a value input from the current detection unit 32 (value detected by the current detection unit 32).

A control unit 10 is a part that can output a control signal to the voltage conversion unit 6, and mainly includes the drive circuit 11 and the control circuit 12.

The control circuit 12 is configured as a microcomputer, for example, and includes a CPU, a ROM, a RAM, a non-volatile memory, and the like. The control circuit 12 functions as a computation unit, and performs feedback control based on a voltage value input from the voltage detection unit 20, a current value input from the current detection unit 30, and a target voltage value, using a known method, and the control circuit 12 sets a duty ratio of a PWM signal to be provided to the voltage conversion unit 6. The control circuit 12 then outputs a PWM signal with the set duty ratio, to the drive circuit 11. The target voltage value may be a value set by the computation unit, or may also be a value designated by an external apparatus, such as an external ECU.

The drive circuit 11 is a circuit that outputs a control signal for switching on or off the switching elements T1, T2, T3, and T4. This drive circuit 11 has a function of outputting, to the voltage conversion unit 6, a PWM signal with a duty ratio set by the control circuit 12.

Voltage Conversion Operation In Step-Down Mode

Here, a case will be described in which the DC-DC converter 1 operates in a step-down mode.

When the DC-DC converter 1 operates in the step-down mode, the first conductive path 91 corresponds to an example of an input-side conductive path, and the second conductive path 92 corresponds to an example of an output-side conductive path. In addition, the voltage detection unit 21 corresponds to an example of an input voltage detection unit, and detects an input voltage applied to the first conductive path 91 (input-side conductive path). In addition, the current detection unit 31 corresponds to an example of an input current detection unit, and detects an input current flowing through the first conductive path 91 (input-side conductive path). Furthermore, the voltage detection unit 22 corresponds to an example of an output voltage detection unit, and detects an output voltage applied to the second conductive path 92 (output-side conductive path). In addition, the current detection unit 32 corresponds to an example of an output current detection unit, and detects an output current flowing through the second conductive path 92 (output-side conductive path). In addition, the control circuit 12 corresponds to an example of a temperature information obtaining unit, and functions so as to obtain temperature information for specifying the temperature of the first power supply unit 101 (input-side power storage unit) electrically connected to the first conductive path 91 (input-side conductive path), and also functions so as to obtain temperature information for specifying the temperature of the second power supply unit 102 (output-side power storage unit) electrically connected to the second conductive path 92 (output-side conductive path).

In the step-down mode, as a result of the control circuit 12 and the drive circuit 11 operating, synchronous rectification control is performed so as to output PWM signals with dead times respectively set for the gates of the switching elements T1 and T2 in a complementary manner. Specifically, the synchronous rectification control is performed such that, while an ON signal (e.g., an H-level signal) is output to the switching element T1, an OFF signal (e.g., an L-level signal) is output to the switching element T2, and, while an ON signal (e.g., an H-level signal) is output to the switching element T2, an OFF signal (e.g., an L-level signal) is output to the switching element T1. Due to this control, an operation of stepping down a DC voltage (input voltage) applied to the first conductive path 91 is performed, and an output voltage that is lower than the input voltage applied to the first conductive path 91 is applied to the second conductive path 92. The output voltage that is applied to the second conductive path 92 is determined according to the duty ratio of the PWM signal provided to the gate of the switching element T1. Note that, in the step-down mode, an ON signal is continuously input to the gate of the switching element T3, and the switching element T3 is maintained in an ON state. In addition, an OFF signal is continuously input to the gate of the switching element T4, and the switching element T4 is maintained in an OFF state.

In the step-down mode, the control circuit 12 performs a known feedback control. Specifically, the control circuit 12 cyclically repeats feedback computation for calculating a duty ratio of a PWM signal (control signal) so as to approximate a voltage of the second conductive path 92 (output-side conductive path in the step-down mode) to the target voltage value, based on an output voltage detected by the voltage detection unit 22 (output voltage detection unit in the step-down mode). In cyclically executed feedback computation, known feedback computation processing such as PID computation or PI computation is performed based on a deviation between the output voltage value and the target voltage value, and a new duty ratio for approximating the output voltage value to the target voltage value is determined. The control circuit 12 continuously outputs a PWM signal (control signal) in the step-down mode, and every time feedback calculation is performed, changes the duty ratio of the PWM signal (control signal) to a value that is based on a new duty ratio (calculated duty) obtained through the feedback computation. The drive circuit 11 obtains a PWM signal provided from the control circuit 12, and outputs a PWM signal having the same cycle and duty ratio as those of the obtained PWM signal, to the gate of the switching element T1. The PWM signal that is output from the drive circuit 11 to the gate of the switching element T1 is adjusted to an appropriate level at which the voltage of an ON signal (H-level signal) can cause the switching element T1 to turn on. The drive circuit 11 then outputs, to the gate of the switching element T2, a PWM signal complementary to the PWM signal output to the gate of the switching element T1, and the synchronous rectification control is performed. The PWM signal that is provided from the drive circuit 11 to the gate of the switching element T2 is also adjusted to an appropriate level at which the voltage of an ON signal (H-level signal) can cause the switching element T2 to turn on.

Limitation Operation In Step-Down Mode

According to this configuration, as shown in FIG. 2(A), a regular range, a first limitation range, a first restricted range, a second limitation range, and a second restricted range are determined as ranges of a charging voltage of the first power supply unit 101. The regular range is a range of the charging voltage in which the limitation value of output power of the first power supply unit 101 is set to a predetermined value (rated value), and, in the example in FIG. 2(A), the regular range is a voltage range higher than or equal to Vb1 and lower than Vb2. The first restricted range is a range of the charging voltage in which output of power from the first power supply unit 101 needs to be prohibited, and, in the example in FIG. 2(A), the first restricted range is a voltage range lower than Va1. The first limitation range is a range in which output of power from the first power supply unit 101 is limited under certain conditions, and, in the example in FIG. 2(A), the first limitation range is a voltage range higher than or equal to Va1 and lower than Vb1. The second restricted range is a range of the charging voltage in which input of power to the first power supply unit 101 needs to be prohibited, and, in the example in FIG. 2(A), the second restricted range is a voltage range higher than or equal to Va2. The second limitation range is a range in which input of power to the first power supply unit 101 is limited under certain conditions, and, in the example in FIG. 2(A), the second limitation range is a voltage range higher than or equal to Vb2 and lower than Va2.

Similarly, as shown in FIG. 2(B), a regular range, a first limitation range, a first restricted range, a second limitation range, and a second restricted range are determined as ranges of a charging voltage of the second power supply unit 102. The regular range is a range of the charging voltage in which the limitation value of output power of the second power supply unit 102 is set to a predetermined value (rated value), and, in the example in FIG. 2(B), the regular range is a voltage range higher than or equal to Vd1 and lower than Vd2. The first restricted range is a range of the charging voltage in which output of power from the second power supply unit 102 needs to be prohibited, and, in the example in FIG. 2(B), the first restricted range is a voltage range lower than Vc1. The first limitation range is a range in which output of power from the second power supply unit 102 is limited under certain conditions, and, in the example in FIG. 2(B), the first limitation range is a voltage range higher than or equal to Vc1 and lower than Vd1. The second restricted range is a range of the charging voltage in which input of power to the second power supply unit 102 needs to be prohibit, and, in the example in FIG. 2(B), the second restricted range is a voltage range higher than or equal to Vc2. The second limitation range is a range in which input of power to the second power supply unit 102 is limited under certain conditions, and, in the example in FIG. 2(B), the second limitation range is a voltage range higher than or equal to Vd2 and lower than Vc2.

Figure 3:
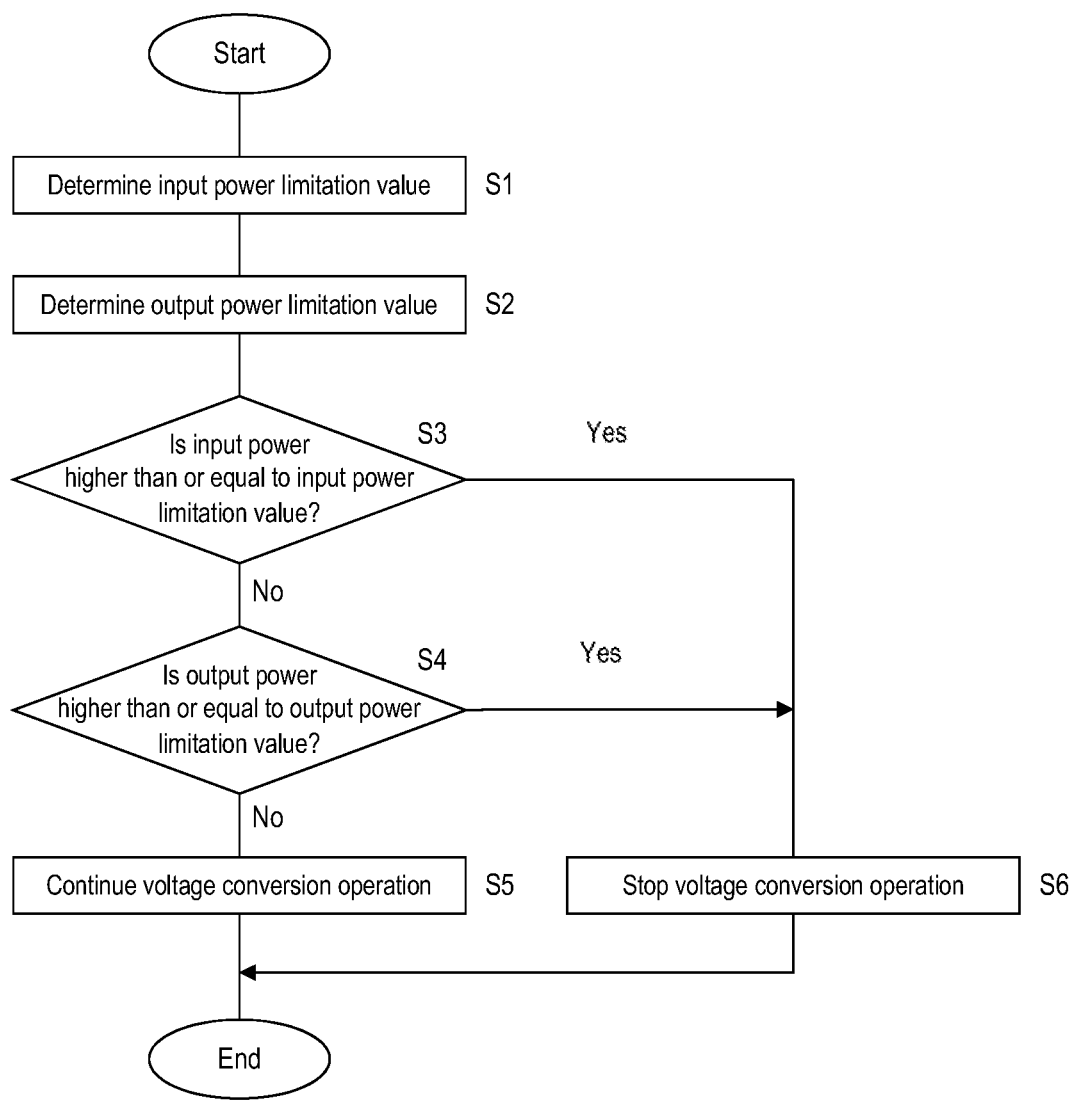
FIG. 3 is a flowchart illustrating a flow of control for protection in the DC-DC converter according to the first embodiment.

When operating in the step-down mode, the control circuit 12 performs control for protection shown in FIG. 3 in parallel with the above-described voltage conversion operation. The control circuit 12 is configured to repeatedly perform the control for protection shown in FIG. 3 at a short time interval, and, after this control has been started, first, in step S1, determines an input power limitation value, and next determines an output power limitation value in step S2.

Figure 4:
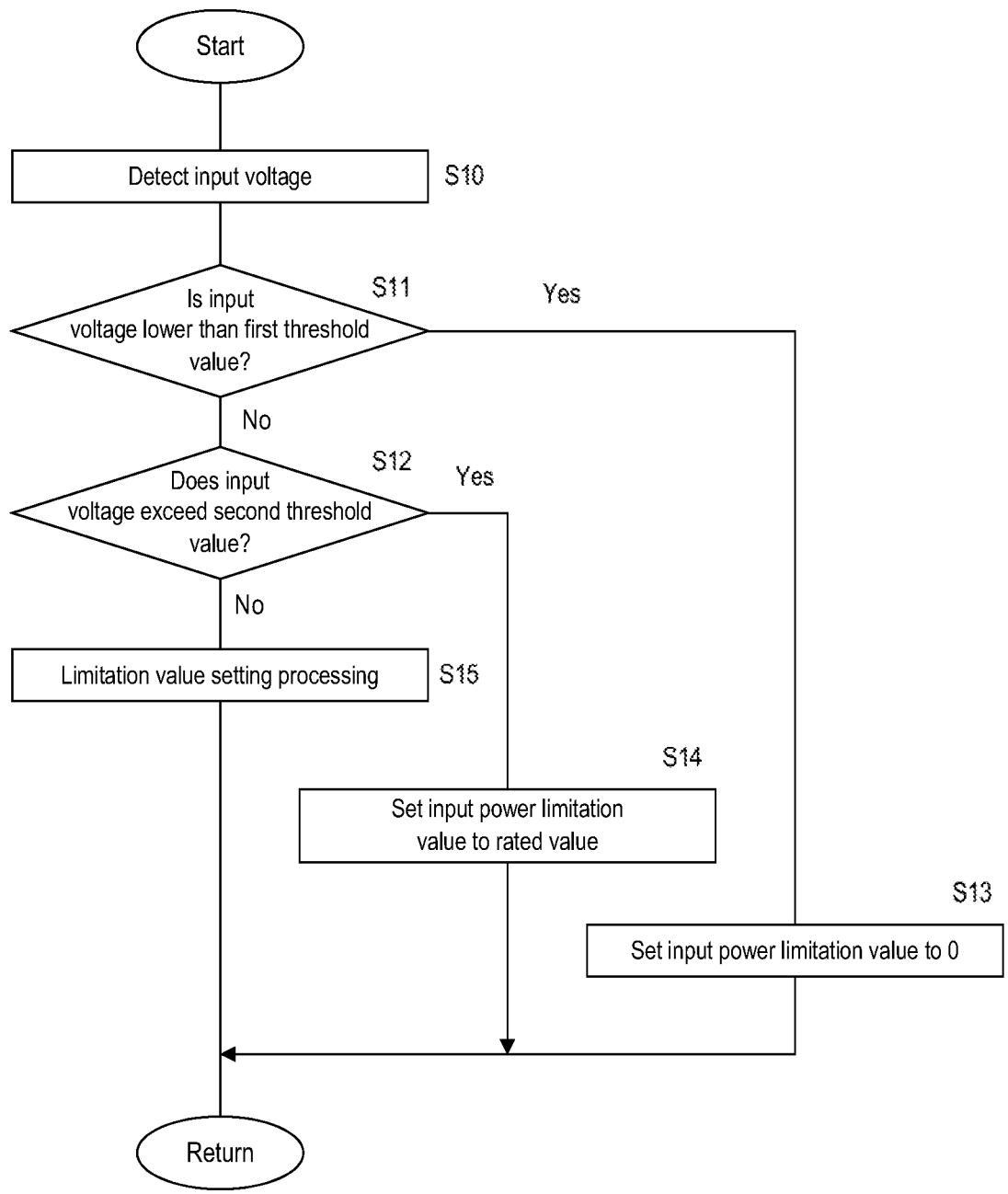
FIG. 4 is a flowchart illustrating a flow of the processing for determining an input power limitation value in the flowchart in FIG. 3.
Figure 5:
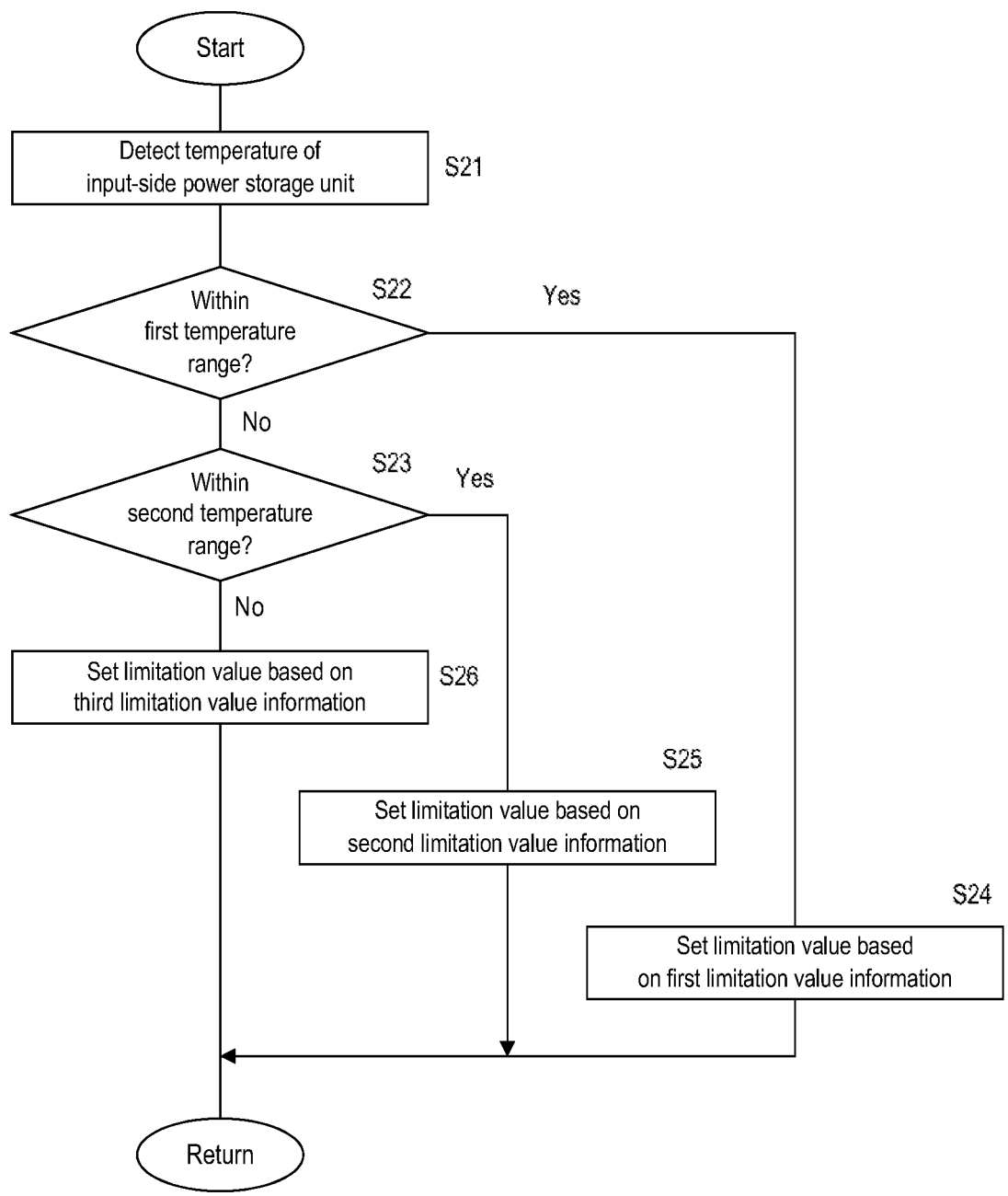
FIG. 5 is a flowchart illustrating a flow of the limitation value setting processing in the flowchart in FIG. 4.

The control circuit 12 performs processing for determining an input power limitation value in step S1, according to the flows shown in FIGS. 4 and 5. First, in step S10 in FIG. 4, the control circuit 12 detects an input voltage applied to the first conductive path 91, and, in the subsequent step S11, determines whether or not the input voltage obtained in step S10 (input voltage applied to the first conductive path 91) is lower than a first threshold value Va1 (in other words, whether or not the obtained input voltage is within a range corresponding to the first restricted range of the first power supply unit 101). If it is determined, in step S11, that the input voltage obtained in step S10 (input voltage applied to the first conductive path 91) is lower than the first threshold value Va1, the control circuit 12 sets the input power limitation value to 0, in step S13. If it is determined in step S11 that the input voltage obtained in step S10 (input voltage applied to the first conductive path 91) is not lower than the first threshold value Va1, the control circuit 12 determines, in step S12, whether or not the input voltage obtained in step S10 (input voltage applied to the first conductive path 91)

exceeds the second threshold value Vb1 (in other words, whether or not the obtained input voltage is in a range other than the first restricted range and the first limitation range of the first power supply unit 101), and, if it is determined that the input voltage exceeds the second threshold value Vb1, the control circuit 12 sets the input power limitation value to a predetermined value (rated value) in step S14. Note that, in the example in FIG. 4, if the input voltage is higher than or equal to the regular range shown in FIG. 2(A), the input power limitation value is set to a predetermined value (rated value), but, as shown in FIG. 2(A), if the input voltage is higher than the regular range, the input power limitation value may be limited further than the predetermined value (rated value). If it is determined, step S12, that the input voltage obtained in step S10 (input voltage applied to the first conductive path 91) does not exceed the second threshold value Vb1, the control circuit 12 performs limitation value setting processing in step S15.

The control circuit 12 performs the limitation value setting processing in step S15 according to the flow shown in FIG. 5. First, in step S21, the control circuit 12 detects the temperature of the first power supply unit 101 (input-side power storage unit). In the system 100 shown in FIG. 1, a temperature sensor 121 is provided in integration with the first power supply unit 101, and this temperature sensor 121 is configured to output temperature information that indicates the temperature of the first power supply unit 101. The control circuit 12 corresponds to an example of a temperature information obtaining unit, is configured to continuously obtain, from the temperature sensor 121, temperature information for specifying the temperature of the first power supply unit 101 (input-side power storage unit), and detects the temperature of the first power supply unit 101 (input-side power storage unit) at the time when the process in step S21 is performed, based on the temperature information obtained from the temperature sensor 121.

In step S22, the control circuit 12 determines whether or not the temperature of the first power supply unit 101 (input-side power storage unit) detected in step S21 is within a first temperature range that is lower than a first threshold temperature Ta (for example, −10° C.), and if the temperature is lower than the first threshold temperature Ta (within the first temperature range), the control circuit 12 sets a limitation value based on first limitation value information in step S24. Also, if it is determined in step S22 that the temperature of the first power supply unit 101 (input-side power storage unit) detected in step S21 is not lower than the first threshold temperature Ta (not within the first temperature range), the control circuit 12 determines in step S23 whether or not the temperature of the first power supply unit 101 (input-side power storage unit) detected in step S21 is within a second temperature range that is lower than a second threshold temperature Tb (for example, 25° C.) and higher than or equal to the first threshold temperature Ta, and, if it is determined that the temperature is lower than the second threshold temperature Tb and higher than or equal to the first threshold temperature Ta (within the second temperature range), the control circuit 12 sets a limitation value based on second limitation value information in step S25. If it is determined, in step S23, that the temperature of the first power supply unit 101 (input-side power storage unit) detected in step S21 is not lower than the second threshold temperature Tb and higher than or equal to the first threshold temperature Ta (not within the second temperature range), the control circuit 12 sets a limitation value based on third limitation value information, in step S26.

According to this configuration, in the control circuit 12, a plurality of temperature-specific limitation ranges that are voltage ranges lower than the predetermined regular voltage range (range of the input voltage higher than or equal to Vb1 and lower than Vb2 shown in FIG. 2(A)) are associated with a plurality of temperature ranges, and limitation value information is associated with the temperature-specific limitation ranges (in other words, the limitation value information is associated with the temperature ranges). Specifically, in the first limitation range, which is higher than or equal to the voltage Va1 and lower than the voltage Vb1, a range lower than the voltage Vb1 and higher than or equal to a voltage Ve3 is determined as a first temperature-specific limitation range, a range lower than a voltage Ve4 and higher than or equal to a voltage Ve1 is determined as a second temperature-specific limitation range, and a range that is lower than a voltage Ve2 and higher than or equal to the voltage Va1 is determined as a third temperature-specific limitation range. The first limitation value information is then associated with the first temperature-specific limitation range, the second limitation value information is associated with the second temperature-specific limitation range, and the third limitation value information is associated with the third temperature-specific limitation range. All of the first limitation value information to the third limitation value information are information in which the relationship between an input voltage and an input power limitation value is determined such that the input power limitation value is decreased as the input voltage decreases, and is information in which, when the input voltage is determined, the input power limitation value is determined. In the example in FIG. 2(A), the first limitation value information is indicated by a first linear equation L1, the second limitation value information is indicated by a second linear equation L2, and the third limitation value information is indicated by a third linear equation L3. In the example in FIG. 2(A), the first limitation value information to the third limitation value information are determined such that the upper limit voltage value is set higher for a temperature-specific limitation range associated with a lower temperature range, the lower limit voltage value is set higher for a temperature-specific limitation range associated with a lower temperature range, and the degree of decrease in the input power limitation value for a decrease in the input voltage is made smaller for limitation value information associated with a lower temperature range (in other words, the gradient of the linear equation for limitation value information associated with a lower temperature range is more moderate). In addition, in the limitation value setting processing shown in FIG. 5, such a limitation value setting scheme is adopted, and an input power limitation value is set in accordance with the limitation value information selected in steps S24 to S26.

For example, when obtaining an input power limitation value in step S24, the control circuit 12 obtains an input power limitation value associated with the input voltage obtained in step S10, based on the first limitation value information, but the linear equation that is specified by the first limitation value information (equation specified by the line L1 shown in FIG. 2(A)) is an equation for when the input voltage is within the range higher than or equal to a lower limit value Ve3 and lower than or equal to the upper limit value Vb1, and, if the input voltage obtained in step S10 exceeds the upper limit value Vb1, the input power limitation value is set to a predetermined value (rated value), and, if the input voltage obtained in step S10 is lower than the lower limit value Ve3, the input power limitation value is set to 0. If the input voltage obtained in step S10 is higher than or equal to the lower limit value Ve3 and lower than or equal to the upper limit value Vb1, the control circuit 12 sets, based on the linear equation specified by the first limitation value information (equation specified by the line L1 shown in FIG. 2(A)) and the input voltage obtained in step S10, the value (limitation value) associated with the input voltage obtained in step S10, as the input power limitation value in the linear equation.

When obtaining an input power limitation value in step S25, the control circuit 12 obtains an input power limitation value associated with the input voltage obtained in step S10, based on the second limitation value information, but the linear equation that is specified by the second limitation value information (equation specified by the line L2 shown in FIG. 2(A)) is an equation for when the input voltage is within the range higher than or equal to a lower limit value Ve1 and lower than or equal to an upper limit value Ve4, and, if the input voltage obtained in step S10 exceeds the upper limit value Ve4, the input power limitation value is set to the predetermined value (rated value), and, if the input voltage obtained in step S10 is lower than the lower limit value Ve1, the input power limitation value is set to 0. If the input voltage obtained in step S10 is higher than or equal to the lower limit value Ve1 and lower than or equal to the upper limit value Ve4, the control circuit 12 sets, based on the linear equation specified by the second limitation value information (equation specified by the line L2 shown in FIG. 2(A)) and the input voltage obtained in step S10, the value (limitation value) associated with the input voltage obtained in step S10, as the input power limitation value in the linear equation.

When obtaining an input power limitation value in step S26, the control circuit 12 obtains an input power limitation value associated with the input voltage obtained in step S10, based on the third limitation value information, but the linear equation that is specified by the third limitation value information (equation specified by the line L3 shown in FIG. 2(A)) is an equation for when the input voltage is within the range higher than or equal to the lower limit value Va1 and lower than or equal to the upper limit value Ve2, and, if the input voltage obtained in step S10 exceeds the upper limit value Ve2, the input power limitation value is set to the predetermined value (rated value), and, if the input voltage obtained in step S10 is lower than the lower limit value Va1, the input power limitation value is set to 0. If the input voltage obtained in step S10 is higher than or equal to the lower limit value Va1 and lower than or equal to the upper limit value Ve2, the control circuit 12 sets, based on the linear equation specified by the third limitation value information (equation specified by the line L3 shown in FIG. 2(A)) and the input voltage obtained in step S10, the value (limitation value) associated with the input voltage obtained in step S10, as the input power limitation value in the linear equation.

Figure 6:
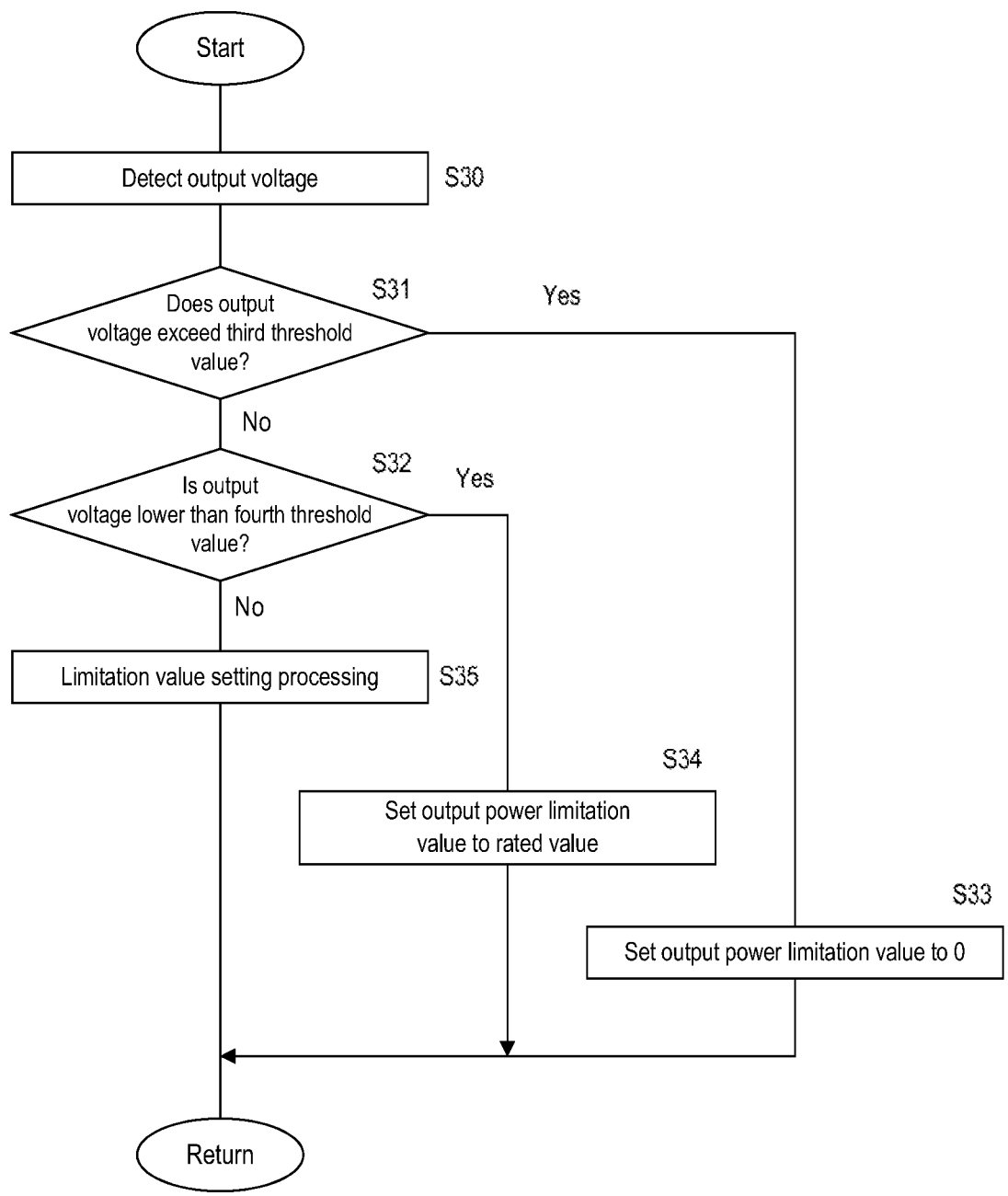
FIG. 6 is a flowchart illustrating a flow of the processing for determining an output power limitation value in the flowchart in FIG. 3.
Figure 7:
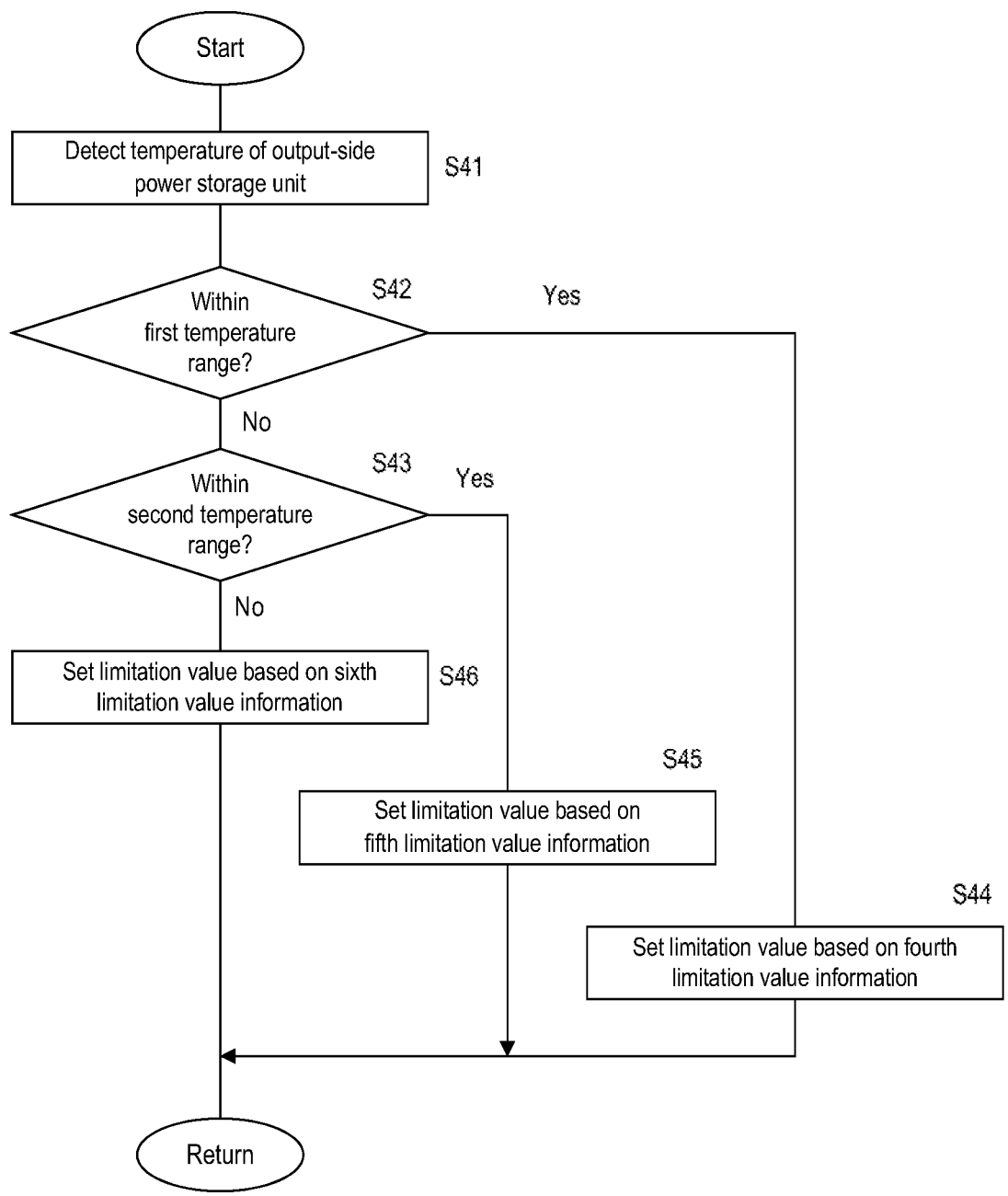
FIG. 7 is a flowchart illustrating a flow of the limitation value setting processing in the flowchart in FIG. 6.

The control circuit 12 performs processing for determining an input power limitation value in step S1 in FIG. 3 according to such a flow, and then performs processing for determining an output power limitation value in step S2 according to the flows in FIGS. 6 and 7.

First, in step S30 shown in FIG. 6, the control circuit 12 detects an output voltage applied to the second conductive path 92, and, in the subsequent step S31, determines whether or not the output voltage obtained in step S30 (output voltage applied to the second conductive path 92) exceeds a third threshold value Vc2 (in other words, whether or not the obtained output voltage is in a range corresponding to the second restricted range of the second power supply unit 102). If it is determined in step S31 that the output voltage obtained in step S30 (output voltage applied to the second conductive path 92) exceeds the third threshold value Vc2, the control circuit 12 sets the output power limitation value to 0 in step S33. If it is determined in step S31 that the output voltage obtained in step S30 (output voltage applied to the second conductive path 92) does not exceed the third threshold value Vc2, the control circuit 12 determines, in step S32, whether or not the output voltage obtained in step S30 (output voltage applied to the second conductive path 92) is lower than the fourth threshold value Vd2 (in other words, whether or not the output voltage is within a range other than the second limitation range and the second restricted range of the second power supply unit 102), and, if it is determined that the output voltage is lower than the fourth threshold value Vd2, the control circuit 12 sets, in step S34, the output power limitation value to the predetermined value (rated value). Note that, in the example in FIG. 6, if the output voltage is lower than or equal to the regular range shown in FIG. 2(B), the output power limitation value is set to the predetermined value (rated value), but, if the output voltage is lower than the regular range, the output power limitation value may also be limited further than the predetermined value (rated value), as shown in FIG. 2(B). If it is determined, in step S32, that the output voltage obtained in step S30 (output voltage applied to the second conductive path 92) is not lower than the fourth threshold value Vd2, the control circuit 12 performs limitation value setting processing in step S35.

The control circuit 12 performs the limitation value setting processing in step S35 according to the flow in FIG. 7, and, first in step S41, detects the temperature of the second power supply unit 102 (output-side power storage unit). In the system 100 shown in FIG. 1, a temperature sensor 122 is provided in integration with the second power supply unit 102, and this temperature sensor 122 is configured to output temperature information that indicates the temperature of the second power supply unit 102. The control circuit 12 corresponds to an example of a temperature information obtaining unit, is configured to continuously obtain, from the temperature sensor 122, temperature information for specifying the temperature of the second power supply unit 102 (output-side power storage unit), and detects the temperature of the second power supply unit 102 (output-side power storage unit) at the time when the process in step S41 is performed, based on the temperature information obtained from the temperature sensor 122.

In step S42, the control circuit 12 determines whether or not the temperature of the second power supply unit 102 (output-side power storage unit) detected in step S41 is within a first temperature range that is lower than the first threshold temperature Ta (e.g., −10° C.), and, if the temperature is lower than the first threshold temperature Ta (within the first temperature range), the control circuit 12 sets the limitation value based on fourth limitation value information, in step S44. In addition, in step S42, if it is determined that the temperature of the second power supply unit 102 (output-side power storage unit) detected in step S41 is not lower than the first threshold temperature Ta (within the first temperature range), the control circuit 12 determines, in step S43, whether or not the temperature of the second power supply unit 102 (output-side power storage unit) detected in step S41 is within a second temperature range that is lower than the second threshold temperature Tb (for example, 25° C.) and higher than or equal to the first threshold temperature Ta, and, if it is determined, in step S45, that the temperature is lower than the second threshold temperature Tb and higher than or equal to the first threshold temperature Ta (within the second temperature range), the control circuit 12 sets a limitation value based on fifth limitation value information. If it is determined, in step S43, that the temperature of the second power supply unit 102 (output-side power storage unit) detected in step S41 is not lower than the second threshold temperature Tb and higher than or equal to the first threshold temperature Ta (not within the second temperature range), the control circuit 12 sets a limitation value based on sixth limitation value information, in step S46.

According to this configuration, in the control circuit 12, a plurality of temperature-specific limitation ranges that are voltage ranges lower than the predetermined regular voltage range (range of the output voltage higher than or equal to Vd1 and lower than Vd2 shown in FIG. 2(B)) are associated with a plurality of temperature ranges, and limitation value information is associated with the temperature-specific limitation ranges (in other words, the limitation value information sets are associated with the temperature ranges). Specifically, in the second limitation range, which is higher than or equal to the voltage Vd2 and lower than the voltage Vc2 as shown in FIG. 2(B), a range higher than or equal to the voltage Vd2 and lower than a voltage Vh3 is determined as a first temperature-specific limitation range, a range that is higher than or equal to a voltage Vh4 and lower than a voltage Vh1 is determined as a second temperature-specific limitation range, and a range that is higher than or equal to a voltage Vh2 and lower than the voltage Vc2 is determined as a third temperature-specific limitation range. Moreover, the fourth limitation value information is then associated with the first temperature-specific limitation range, the fifth limitation value information is associated with the second temperature-specific limitation range, and the sixth limitation value information is associated with the third temperature-specific limitation range. All of the fourth limitation value information to the sixth limitation value information are information in which the relationship between an output voltage and an output power limitation value is determined such that the output power limitation value is decreased as the output voltage increases, and is information in which, when the output voltage is determined, the output power limitation value is determined. In the example in FIG. 2(B), the fourth limitation value information is indicated by a fourth linear equation L4, the fifth limitation value information is indicated by a fifth linear equation L5, and the sixth limitation value information is indicated by a sixth linear equation L6. In the example in FIG. 2(B), the fourth limitation value information to the sixth limitation value information are determined such that the lower limit voltage value is set lower for a temperature-specific limitation range associated with a lower temperature range, the upper limit voltage value is set lower for a temperature-specific limitation range associated with a lower temperature range, and the degree of decrease in the output power limitation value for an increase in the output voltage is made smaller for limitation value information associated with a lower temperature range (in other words, the gradient of the linear equation for limitation value information associated with a lower temperature range is more moderate). In addition, in the limitation value setting processing shown in FIG. 7, such a limitation value setting scheme is adopted, and an output power limitation value is set in accordance with the limitation value information selected in steps S44 to S46.

For example, when obtaining an output power limitation value in step S44, the control circuit 12 obtains an output power limitation value associated with the output voltage obtained in step S30, based on the fourth limitation value information, but the linear equation that is specified by the fourth limitation value information (equation specified by the line L4 shown in FIG. 2(B)) is an equation for when the output voltage is within the range higher than or equal to the lower limit value Vd2 and lower than or equal to the upper limit value Vh3, and, if the output voltage obtained in step S30 exceeds the upper limit value Vh3, the output power limitation value is set to 0, and, if the output voltage obtained in step S30 is lower than the lower limit value Vd2, the output power limitation value is set to the predetermined value (rated value). If the output voltage obtained in step S30 is higher than or equal to the lower limit value Vd2 and lower than or equal to the upper limit value Vh3, the control circuit 12 sets, based on the linear equation specified by the fourth limitation value information (equation specified by the line L4 shown in (FIG. 2(B)) and the output voltage obtained in step S30, the value (limitation value) associated with the output voltage obtained in step S30, as the output power limitation value in the linear equation.

When obtaining an output power limitation value in step S45, the control circuit 12 obtains an output power limitation value associated with the output voltage obtained in step S30, based on the fifth limitation value information, but the linear equation that is specified by the fifth limitation value information (equation specified by the line L5 shown in FIG. 2(B)) is an equation for when the output voltage is within the range higher than or equal to the lower limit value Vh4 and lower than or equal to the upper limit value Vh1, and, if the output voltage obtained in step S30 exceeds the upper limit value Vh1, the output power limitation value is set to 0, and, if the output voltage obtained in step S30 is lower than the lower limit value Vh4, the output power limitation value is set to a predetermined value (rated value). If the output voltage obtained in step S30 is higher than or equal to the lower limit value Vh4 and lower than or equal to the upper limit value Vh1, the control circuit 12 sets, based on the linear equation specified by the fifth limitation value information (equation specified by the line L5 shown in FIG. 2(B)) and the output voltage obtained in step S30, the value (limitation value) associated with the output voltage obtained in step S30, as the output power limitation value in the linear equation.

When obtaining an output power limitation value in step S46, the control circuit 12 obtains output power limitation value associated with the output voltage obtained in step S30, based on the sixth limitation value information, but the linear equation specified by the sixth limitation value information (equation specified by the line L6 shown in FIG. 2(B)) is an equation for when the output voltage is within the range higher than or equal to the lower limit value Vh2 and lower than or equal to the upper limit value Vc2, and, if the output voltage obtained in step S30 exceeds the upper limit value Vc2, the output power limitation value is set to 0, and, if the output voltage obtained in step S30 is lower than the lower limit value Vh2, the output power limitation value is set to a predetermined value (rated value). If the output voltage obtained in step S30 is higher than or equal to the lower limit value Vh2 and lower than or equal to the upper limit value Vc2, the control circuit 12 sets, based on the linear equation specified by the sixth limitation value information (equation specified by the line L6 shown in FIG. 2(B) and the output voltage obtained in step S30, the value (limitation value) associated with the output voltage obtained in step S30, as the output power limitation value in the linear equation.

The control circuit 12 performs processing for determining an output power limitation value in step S2 in FIG. 3 according to such a flow, and then determines, in step S3, whether or not an input power Pin specified by an input voltage Vin and an input current Iin (Pin=Vin×Iin) is higher than or equal to the input power limitation value determined in the process in step S1, and if the input power Pin is higher than or equal to the input power limitation value, the control circuit 12 stops the operation of the voltage conversion unit 6 in step S6.

If it is determined, in step S3 in FIG. 3, that the input power Pin is not higher than or equal to the input power limitation value, the control circuit 12 determines whether or not an output power Pout specified by an output voltage Vout and an output current Iout (Pout=Vout×Iout) is higher than or equal to an output power limitation value, and if the output power Pout is higher than or equal to the output power limitation value, the control circuit 12 stops the operation of the voltage conversion unit 6 in step S6. In this manner, if the determination unit (the control circuit 12) determines that the input power Pin has reached the input power limitation value, the control unit 10 (specifically, the control circuit 12) operates so as to stop the voltage conversion operation of the voltage conversion unit 6, and, if the determination unit (the control circuit 12) determines that the output power Pout has reached the output power limitation value, the control unit 10 operates so as to stop the voltage conversion operation of the voltage conversion unit 6.

If it is determined, in step S4 shown in FIG. 3, that the output power Pout is not higher than or equal to the output power limitation value, the control circuit 12 continues the voltage conversion operation of the voltage conversion unit 6. Note that, if the voltage conversion operation of the voltage conversion unit 6 is not stopped in step S6, the control circuit 12 continues the voltage conversion operation of the voltage conversion unit 6 until a predetermined end condition is satisfied.

Note that, in the above description, the operation of the voltage conversion unit 6 is stopped in step S6, but, in this case, the operation of the voltage conversion unit 6 may be stopped by outputting an OFF signal to all of the switching elements T1, T2, T3, and T4, or conduction of the first conductive path 91 may also be shut off by switching a switching element for protection (not illustrated) provided in the first conductive path 91, to an off-state. In addition, in step S6, the voltage conversion operation of the voltage conversion unit 6 may also be suppressed such that, without completely stopping the voltage conversion operation of the voltage conversion unit 6, the duty rate of a control signal to be supplied to the voltage conversion unit 6 is decreased below the duty rate at the time of step S1 or S2, so as to suppress an input current and an output current.

With this configuration, the control circuit 12 corresponds to an example of a determination unit, and functions so as to determine whether or not input power of the input-side conductive path (the first conductive path 91 in the step-down mode) has reached an input power limitation value, and furthermore, if the input voltage satisfies a certain condition, the control circuit 12 determines whether or not the input power of the input-side conductive path has reached an input power limitation value that is determined in accordance with the input voltage of the input-side conductive path and a temperature range to which the temperature of the input-side power storage unit (the first power supply unit 101 in the step-down mode) belongs. In addition, the control circuit 12 functions so as to determine whether or not the output power of the output-side conductive path (the second conductive path 92 in the step-down mode) has reached an output power limitation value, and if the output voltage satisfies a certain condition, the control circuit 12 determines whether or not the output power of the output-side conductive path has reached an output power limitation value that is determined according to the output voltage of the output-side conductive path and a temperature range to which the temperature of the output-side power storage unit (the second power supply unit 102 in the step-down mode) belongs.

Voltage Conversion Operation In Step-Up Mode

Note that operations in the step-down mode have been mainly described above, but an operation for protection can be performed similarly also in a step-up mode.

When the DC-DC converter 1 operates in the step-up mode, the second conductive path 92 corresponds to an example of an input-side conductive path, and the first conductive path 91 corresponds to an example of an output-side conductive path. In the step-up mode, as a result of the control circuit 12 and the drive circuit 11 operating, synchronous rectification control is performed so as to output PWM signals with dead times respectively set for the gates of the switching elements T1 and T2 in a complementary manner. Specifically, the synchronous rectification control is performed such that, while an ON signal (e.g., an H-level signal) is output to the switching element T2, an OFF signal (e.g., an L-level signal) is output to the switching element T1, and, while an ON signal (e.g., an H-level signal) is output to the switching element T1, an OFF signal (e.g., an L-level signal) is output to the switching element T2. Due to this control, an operation of stepping up a DC voltage (input voltage) applied to the second conductive path 92 is performed, and an output voltage that is higher than the input voltage applied to the second conductive path 92 is applied to the first conductive path 91. The output voltage that is applied to the first conductive path 91 is determined according to the duty ratio of the PWM signal provided to the gate of the switching element T2. Note that, in the step-up mode, an ON signal is continuously input to the gate of the switching element T3, and the switching element T3 is maintained in an ON state. In addition, an OFF signal is continuously input to the gate of the switching element T4, and the switching element T4 is maintained in an OFF state.

In the step-up mode, the control circuit 12 performs feedback control of a known scheme. Specifically, the control circuit 12 cyclically repeats feedback computation for calculating a duty ratio of a PWM signal (control signal) so as to approximate the voltage of the first conductive path 91 (output-side conductive path in the step-up mode) to a target voltage value, based on an output voltage detected by the voltage detection unit 21 (output voltage detection unit in the step-up mode). The feedback calculation can be performed in the same manner as in the step-down mode. The control circuit 12 continuously outputs a PWM signal (control signal) in the step-up mode, and every time feedback calculation is performed, changes the duty ratio of the PWM signal (control signal) to a value that is based on a new duty ratio (calculated duty) obtained through the feedback computation. The drive circuit 11 obtains the PWM signal provided from the control circuit 12 and outputs a PWM signal having the same cycle and duty ratio as those of the obtained PWM signal, to the gate of the switching element T2. The PWM signal that is output from the drive circuit 11 to the gate of the switching element T2 is adjusted to an appropriate level at which the voltage of an ON signal (H-level signal) can cause the switching element T2 to turn on. The drive circuit 11 then outputs, to the gate of the switching element T1, a PWM signal complementary to the PWM signal output to the gate of the switching element T2, and the synchronous rectification control is performed. The PWM signal that is provided from the drive circuit 11 to the gate of the switching element T1 is also adjusted to an appropriate level at which the voltage of an ON signal (H-level signal) can cause the switching element T1 to turn on.

Limitation Operation In Step-Up Mode

When the DC-DC converter 1 operates in the step-up mode, the voltage detection unit 22 corresponds to an example of an input voltage detection unit, and detects an input voltage applied to the second conductive path 92 (input-side conductive path). In addition, when the DC-DC converter 1 operates in the step-up mode, the current detection unit 32 corresponds to an example of an input current detection unit, and detects an input current flowing through the second conductive path 92 (input-side conductive path). In addition, when the DC-DC converter 1 operates in the step-up mode, the control circuit 12 corresponds to an example of a temperature information obtaining unit, and functions so as to obtain temperature information for specifying the temperature of the second power supply unit 102 (input-side power storage unit) electrically connected to the second conductive path 92 (input-side conductive path), and also functions so as to obtain temperature information for specifying the temperature of the first power supply unit 101 (output-side power storage unit) electrically connected to the first conductive path 91 (output-side conductive path).

When operating in the step-up mode, the DC-DC converter 1 may set an input power limitation value based on the input voltage of the second conductive path 92 using a method similar to the method for setting an input power limitation value based on the input voltage of the first conductive path 91 in the step-down mode. In addition, an output power limitation value may be set based on the output voltage of the first conductive path 91, using a method similar to the method used for setting an output power limitation value based on the output voltage of the second conductive path 92 in the step-down mode. Control for protection can be performed, similarly to a case where the DC-DC converter 1 operates in the step-down mode, according to the flows shown in FIGS. 3 to 7.

Next, effects of this configuration will be described.

In the above-described DC-DC converter 1, it is possible to change limitation value information (information in which the relationship between an input voltage and an input power limitation value is determined) according to the temperature of the input-side power storage unit, and to determine a limitation value of input power in accordance with the temperature of the input-side power storage unit. In limitation value information corresponding to any temperature range, the relationship between an input voltage and an input power limitation value is determined such that the input power limitation value is decreased as the input voltage decreases, and thus the lower the input voltage is (in other words, the lower the charging voltage of the input-side power storage unit is), the more the input power is limited. Furthermore, when determining an input power limitation value when the range of the input voltage is lower than a regular range, limitation value information is determined such that the upper limit voltage value of a temperature-specific limitation range is set higher for a lower temperature range, and the degree of decrease in the input power limitation value for a decrease in the input voltage is made smaller, and thus, when the temperature of the power storage unit is lower, limitation can be started at a higher input voltage, and the range of an input voltage that is limited can be made wider.

In addition, the DC-DC converter 1 can change limitation value information (information in which the relationship between an output voltage and an output power limitation value is set) according to the temperature of the output-side power storage unit, and can determine the limitation value of output power in accordance with the temperature of the output-side power storage unit. In addition, in limitation value information corresponding to any temperature range, the relationship between an output voltage and an output power limitation value is determined such that the output power limitation value is decreased as the output voltage increases, and thus, the higher the output voltage is (in other words, the higher the charging voltage of the output-side power storage unit is), the more the output power is limited. Furthermore, when determining an output power limitation value if the range of output voltage is higher than the regular range, limitation value information is determined such that a lower limit voltage value of a temperature-specific limitation range is set lower for a lower temperature range and the degree of decrease in output power limitation value for an increase in output voltage is made smaller, and thus when the temperature of the power storage unit is lower, limitation can be started at a lower output voltage, and the range of an output voltage that is limited can be made wider.

The control circuit 12 that corresponds to a determination unit sets the lower limit voltage value higher for a temperature-specific limitation range associated with a lower temperature range, in the limitation value setting scheme for determining an input power limitation value. With such a configuration, the lower limit of the input voltage range (temperature-specific limitation range) for which an input power limitation value is determined according to the input voltage can be set higher for a lower temperature range, and thus, if a current change occurs when the input voltage is in the vicinity of the lower limit voltage value, the input power limitation value is easily reached at a higher input voltage for a lower temperature range.

Furthermore, if the determination unit determines that the input power has reached the input power limitation value, the control unit 10 operates so as to stop or suppress the voltage conversion operation of the voltage conversion unit 6. With such a configuration, it is possible to stop or suppress the voltage conversion unit 6 taking in an current from the input-side power storage unit by stopping or suppressing the operation of the voltage conversion unit when the input power decreases to a certain degree, and to change the limitation value of the input power when such a stopping or suppressing process is performed, in accordance with the temperature of the input-side power storage unit.

In the limitation value setting scheme, the determination unit is configured to determine the upper limit voltage value to be lower for a temperature-specific limitation range associated with a lower temperature range. With such a configuration, the upper limit of the output voltage range (temperature-specific limitation range) for which an output power limitation value is determined according to output voltage can be set lower for a lower temperature range, and thus, if a current change occurs when the output voltage is in the vicinity of the upper limit voltage value, the output power limitation value is easily reached at a lower output voltage for a lower temperature range.

In addition, if the determination unit determines that the output power has reached the output power limitation value, the control unit 10 stops or suppresses the voltage conversion operation of the voltage conversion unit 6. With such a configuration, when the output power increases to a certain degree, it is possible to stop or suppress the voltage conversion unit 6 causing a current to flow to the output-side power storage unit by stopping or suppressing the operation of the voltage conversion unit, and to change the limitation value of the output power when such a stopping or suppressing process is performed, according to the temperature of the output-side power storage unit.

Other Embodiments

The present disclosure is not limited to the embodiment described above with reference to the drawings. For example, the following examples are also included in the technical scope according to the present disclosure. Moreover, the various features in the embodiments described above and below may be freely combined unless such combined features are inconsistent with one another.

In the first embodiment, an example has been described in which, in the limitation value setting scheme for determining a limitation value of input power, as the limitation value information associated with any of the temperature ranges, the equation for determining the relationship between an input voltage and an input power limitation value such that such that the input power limitation value is decreased as the input voltage decreases is a linear equation, but this equation may also be a curve equation, and information in which the relationship between an input voltage and an input power limitation value is set such that the input power limitation value decreases stepwise as the input voltage decreases may also be used. Similarly, an example has been described in which, in the limitation value setting scheme for determining a limitation value of output power, as the limitation value information associated with any of the temperature ranges, an equation for determining the relationship between an output voltage and an output power limitation value such that the output power limitation value is decreased as the output voltage increases is a linear equation, but this equation may also be a curve equation, and information in which the relationship between an output voltage and an output power limitation value is set such that the output power limitation value is decreased stepwise as the output voltage increases may also be used.

In the first embodiment, a bidirectional step up/down DC-DC converter is described as an example of a DC-DC converter, but a step-down DC-DC converter, a step-up DC-DC converter, or a step up/down DC-DC converter may also be used. Moreover, a bidirectional DC-DC converter that can make a switch between the input side and the output side as in the first embodiment may also be used, or a unidirectional DC-DC converter in which the input side or the output side are fixed may also be used.

In the first embodiment, a single-phase DC-DC converter is described as an example, but a multiphase DC-DC converter may also be used.

In the first embodiment, a synchronous rectification DC-DC converter is described as an example, but a diode DC-DC converter in which some switching elements are replaced with diodes may also be used.

In the first embodiment, switching elements T1, T2, T3, and T4 configured as N-channel MOSFETs are described as switching elements of a DC-DC converter, but the switching elements may also be P-channel MOSFETs or a different type of switching element such as bipolar transistors.

In the first embodiment, the control circuit 12 is mainly constituted by a microcomputer, but may also be realized by a plurality of hardware circuits other than a microcomputer.

The invention claimed is:

1. An in-vehicle DC-DC converter that steps up or down a voltage applied to an input-side conductive path and outputs the voltage to an output-side conductive path, the in-vehicle DC-DC converter comprising:
    a voltage conversion unit that includes a switching element that performs an on and off operation in accordance with being supplied with a control signal, the voltage conversion unit stepping up or down the voltage applied to the input-side conductive path, through an on and off operation by the switching element, and outputting the voltage to the output-side conductive path;
    a control unit that outputs the control signal to the voltage conversion unit;
    an input voltage detection unit that detects an input voltage applied to the input-side conductive path;
    an input current detection unit that detects an input current flowing through the input-side conductive path;
    a determination unit that determines whether or not input power of the input-side conductive path has reached an input power limitation value; and
    a temperature information obtaining unit that obtains temperature information for specifying a temperature of an input-side power storage unit electrically connected to the input-side conductive path,
    wherein the determination unit determines,
    a limitation value information based on a limitation value setting scheme of a plurality of temperature-specific limitation ranges, the plurality of temperature-specific ranges are voltage ranges lower than a predetermined regular voltage range and are associated with a plurality of temperature ranges, wherein the limitation value information in which a relationship between the input voltage and the input power limitation value is determined such that the input power limitation value is decreased as the input voltage decreases, and wherein an upper limit voltage value is set higher for a temperature-specific limitation range associated with a lower temperature range and a degree of decrease in the input power limitation value for a decrease in the input voltage is made smaller for the limitation value information associated with a lower temperature range,
    whether or not the input power of the input-side conductive path has reached the input power limitation value that is determined according to the input voltage of the input-side conductive path and a temperature range to which the temperature of the input-side power storage unit belongs.

2. The in-vehicle DC-DC converter according to claim 1, wherein, in the limitation value setting scheme, the determination unit determines a lower limit voltage value to be higher for a temperature-specific limitation range associated with a lower temperature range.

3. The in-vehicle DC-DC converter according to claim 1, wherein, when the determination unit determines that the input power has reached the input power limitation value, the control unit stops or suppresses a voltage conversion operation of the voltage conversion unit.

4. An in-vehicle DC-DC converter that steps up or down a voltage applied to an input-side conductive path and outputs the voltage to an output-side conductive path, the in-vehicle DC-DC converter comprising:

a voltage conversion unit that includes a switching element that performs an on and off operation in accordance with being supplied with a control signal, the voltage conversion unit stepping up or down the voltage applied to the input-side conductive path, through an on/off operation by the switching element, and outputting the voltage to the output-side conductive path;

a control unit that outputs the control signal to the voltage conversion unit;

an output voltage detection unit that detects an output voltage applied to the output-side conductive path;

an output current detection unit that detects an output current flowing through the output-side conductive path;

a determination unit that determines whether or not output power of the output-side conductive path has reached an output power limitation value; and a temperature information obtaining unit that obtains temperature information for specifying a temperature of an output-side power storage unit electrically connected to the output-side conductive path, wherein the determination unit determines, a limitation value information based on a limitation value setting scheme of a plurality of temperature-specific limitation ranges, the plurality of temperature-specific ranges are voltage ranges higher than a predetermined regular voltage range and are associated with a plurality of temperature ranges, wherein the limitation value information in which a relationship between the output voltage and the output power limitation value is determined such that the output power limitation value is decreased as the output voltage increases, and wherein a lower limit voltage value is set lower for a temperature-specific limitation range associated with a lower temperature range, and a degree of decrease in the output power limitation value for an increase in the output voltage is made smaller for the limitation value information associated with a lower temperature range, whether or not the output power of the output-side conductive path has reached the output power limitation value that is determined according to the output voltage of the output-side conductive path and a temperature range to which the temperature of the output-side power storage unit belongs.

5. The in-vehicle DC-DC converter according to claim 4, wherein, in the limitation value setting scheme, the determination unit determines an upper limit voltage value to be lower for a temperature-specific limitation range associated with a lower temperature range.

6. The in-vehicle DC-DC converter according to claim 4, wherein, when the determination unit determines that the output power has reached the output power limitation value, the control unit stops or suppresses a voltage conversion operation of the voltage conversion unit.

7. The in-vehicle DC-DC converter according to claim 2, wherein, when the determination unit determines that the input power has reached the input power limitation value, the control unit stops or suppresses a voltage conversion operation of the voltage conversion unit.

8. The in-vehicle DC-DC converter according to claim 5, wherein, when the determination unit determines that the output power has reached the output power limitation value, the control unit stops or suppresses a voltage conversion operation of the voltage conversion unit.

* * * * *